3,219,638
POLYSULFIDE POLYMERS AND PROCESS FOR
THEIR PREPARATION
Paul F. Warner, Phillips, Tex., assignor to Phillips Petroleum Company, a corporation of Delaware
No Drawing. Filed Nov. 9, 1961, Ser. No. 151,178
11 Claims. (Cl. 260—79)

This invention relates to the production of polysulfide polymers. In accordance with one aspect, this invention relates to a process for controlling the properties, especially molecular weight, of polysulfide polymers produced from mercaptans and sulfur. In another aspect, this invention relates to a novel polymer produced according to the process of the invention.

Various processes are known for the production of polysulfide polymers. Some of these known processes employ catalysts while others are purely thermal. However, many of the known processes have various disadvantages for one reason or another. For example, some of these processes require high temperatures, others require expensive catalysts, and still others require expensive and difficult to produce reactants, while still others require complicated recovery steps, which are expensive, to recover the polymer from the reaction effluent. Thus, it can be safely stated that there is still considerable room for improvement in the production of these materials, especially with respect to the provision of a process wherein readily available reactants can be used and a simple recovery system provided for the production of valuable polysulfide polymers.

The present invention relates to a process for the production of polysulfide polymers of controlled properties, particularly molecular weight, by the oxidation of dimercaptans with sulfur in the presence of a monomercaptan compound.

Accordingly, an object of this invention is to provide an improved process for the production of polysulfide polymers.

Another object of this invention is to provide a process for the reaction of dimercaptans with sulfur to form polysulfide polymers having a desired molecular weight.

A further object of this invention is to provide novel saturated sulfide polymers of controlled molecular weight.

Other objects, aspects as well as the several advantages of this invention will be apparent to those skilled in the are on a further study of this specification and the appended claims.

According to the invention, it has been found that monomercaptans having up to and including 16 carbon atoms are effective for controlling the properties, especially molecular weight, of polysulfide polymers formed by contacting an organic dimercaptan compound with sulfur as an oxidizing agent in the presence of a basic catalyst. The polymers obtained, according to the invention, are saturated and the linkage is through sulfur rather than olefin as is the case with many known polymers. It has been found that the molecular weight of polysulfide polymers obtained by the above reaction can be controlled by regulating the ratio of dimercaptan to monomercaptan during contacting.

The monomercaptans that can be employed according to the invention can be represented by the formula RSH wherein R is selected from alkyl, aryl, alkaryl, aralkyl, and halogen substituted alkyl, aryl, alkaryl, aralkyl radicals containing from 1 to 16, inclusive, carbon atoms. Representative examples of suitable monomercaptans that can be employed include methyl mercaptan, ethyl mercaptan, isopropyl mercaptan, n-butyl mercaptan, n-hexyl mercaptan, tert-octyl mercaptan, tert-dodecyl mercaptan, n-hexyldecyl mercaptan, phenyl mercaptan, benzyl mercaptan, p-xyllyl mercaptan, pentachlorothiophenol, 10-phenyldecyl mercaptan, and the like.

The amount of monomercaptan employed during polymerization will vary appreciably and will depend primarily upon the molecular weight polymer desired. However, ordinarily the mol ratio of dimercaptan to monomercaptan will range from 1:1 to 50:1, preferably from 2:1 to 10:1. As indicated above the mono-mercaptan serves to terminate the polysulfide chains so as to form a polymer of a desired molecular weight. While the theory underlying this is not understood it has been definitely determined that the mercaptan enters into the reaction and is chemically combined in the product which contains chemically combined sulfur.

The dimercaptan reactants that can be employed according to the invention can be represented by the formula HS—R—SH wherein R is an organic radical containing up to and including 20 carbon atoms per molecule. The hydrocarbon dimercaptans and especially the cyclic hydrocarbon dimercaptans as exemplified by 2,9-p-menthane dithiol are preferred. In the above formula, R can be a hydrocarbon radical such as aliphatic, cycloaliphatic, aryl and the like or a heterocyclic structure such as:

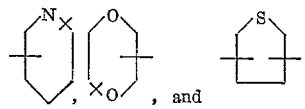, and as well as other organic radicals.

Representative examples of suitable dimercaptan compounds that can be employed according to the invention include dimercapto ethane, dimercapto propane, 1,5-dimercapto pentane, 1,6-dimercapto hexane, 1,8-dimercapto decane, 2,3-dimercapto pentadecane, 1,6-dimercapto eicosane, 1,4 - dimercapto - 2 - butene, 1,8 - dimercapto-2-octene, dimercapto ethyl ether, dimercapto propyl ether, dimercapto dipropyl sulfide, dimercapto xylene, dimercapto diethoxy benzene, 1,3-dimercapto toluene, p-dimercapto benzene, dimercapto cyclohexane, dimercapto methylcyclohexane, 2,9-p-menthane dithiol, dimercapto alphaterpinene, dimercapto phellandrene, dimercapto sylvestrene, 2,5-dimercapto pyridine, dimercapto thiophene, dimercapto p-dioxane and the like.

The oxidizing agent that can be employed according to the invention includes free or elemental sulfur and sulfurdonor or sulfur-yielding compounds. Suitable sulfurdonor or sulfur yielding compounds that can be used include thiuram polysulfides having the structural formula

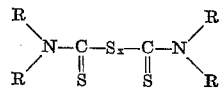

in which $x$ is 2, 3, or 4, R represents an alkyl or cycloalkyl group containing up to and including 10 carbon atoms, and the R's attached to a terminal nitrogen atom can be joined to form with said nitrogen atom a heterocyclic structure. Examples of such compounds are tetramethylthiuram disulfide, tetraethylthiuram trisulfide, tetraamylthiuram disulfide, tetradecylthiuram disulfide, tetraoctylthiuram disulfide, tetracyclohexylthiuram disulfide, dipentamethylenethiuram tetrasulfide, and the like.

Selenium dithiocarbamates of the formula

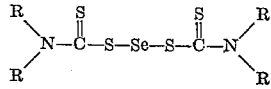

wherein the R groups represent alkyl or cycloalkyl radicals containing up to and including 10 carbon atoms, and the R's attached to a terminal nitrogen atom can be joined to form with said nitrogen a heterocyclic structure, can also be employed as the sulfur-yielding compounds, Examples of such compounds are selenium dimethyl dithiocarbamate, selenium diethyl dithiocarbamate, selenium didecyldithiocarbamate, selenium dioctyldithiocarbamate, selenium dinonyldithiocarbamate, selenium dicyclohexyl dithiocarbamate, selenium pentamethylenedithiocarbamate, and the like.

Other sulfur-donor compounds that can be used include N,N'-polythiodiamines of the formula

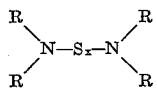

where $x$ is 2, 3 or 4, and R represents an alkyl or cycloalkyl group containing up to and including 10 carbon atoms, such radicals being purely hydrocarbon or substituted by cyano groups. The R groups can be joined to form heterocyclic structures which include the nitrogen atom, such heterocyclic structures being joined by juncture of alkyl groups or inclusive of oxygen, sulfur or nitrogen. Examples of such compounds are N,N'-dithiobis(diethylamine), N,N' - dithiobis(dibutylamine), N,N' - trithiobis (dihexylamine), N,N'-dithiobis(dioctylamine), N,N'-dithiobis(didecylamine), N,N' - dithiobis(morpholine), N, N'-dithiobis(thiamorpholine), N,N'-dithiobis(piperidine), N,N'-dithiobis(piperazine), N,N'-dithiobis-(n-butylaminoacetonirtile), N,N' - dithiobis(beta - ethylaminopropionitrile), N,N'-tetrathiobis(octyl-6-cyanooctylamine), N,N'-dithiobis(dicyclohexylamine), N,N' - dithiobis(decyl - 5-cyanoamylamine), N,N' - trithiobis(hexyl-9-cyanononylamine), N,N'-dithiobis(n-butylaminopropionitrile), and the like.

Another class of compounds suitable for the purposes of the present invention are the thiazyl sulfides, including mercaptobenzothiazole, zinc 2-mercaptobenzothiazole, cupric 2-mercaptobenzothiazole, benzothiazyl disulfide, and the like.

An additional class of compounds suitable for the purposes of the invention include the disulfides of the general formula R—$S_x$—R in which $x$ is 2, 3 or 4, and R is an alkyl or cycloalkyl group containing from 1 to 16 carbon atoms. Typical examples of such compounds are dimethyl disulfide, diethyl disulfide, di-n-propyl disulfide, diisopropyl disulfide, diamyl disulfide, dicyclohexyl disulfide, dioctyl disulfide, didecyl disulfide, ditetradecyl disulfide, dihexadecyl trisulfide and the like.

The ratio of sulfur to dimercaptan employed will vary appreciably but will generally be at least 2 moles of sulfur per mole of dimercaptan. It is preferred to employ a mole ratio of sulfur to dimercaptan in the range 2 to 5 moles of sulfur per mole of dimercaptan.

The reaction according to the invention is ordinarily carried out at an elevated temperature. Generally speaking it is desirable to operate at a temperature high enough to maintain the sulfur in a molten condition. The actual temperatures employed will depend upon the mercaptans being reacted and the product desired. In general, however, the temperature will range from about 0 to about 500° F., preferably from about 150 to about 300° F.

The pressure at which the reaction is carried out will depend upon the mercaptans being reacted, the reaction diluent as well as other process variables. Generally speaking this pressure is sufficient to maintain the reactants substantially in the liquid phase. In general, however, the pressure will range from 0 to about 100 p.s.i.g., preferably from 0 to about 15 p.s.i.g. The reaction time will vary appreciably but ordinarily will range from about 0.25 to about 10 hours, preferably from about 1 to about 2 hours.

Catalysts suited for the purposes of this invention include those compounds having an alkaline reaction such as oxides and hydroxides of the alkali metals, alkali metal sulfides, ammonia, amines, etc. but the amines are preferred for their solubility in the reaction mixtures. Representative examples of suitable amines that can be employed include mono, di- and trialkyl amines having up to about 6 carbon atoms in each alkyl group, such as monoethanolamine, diethanolamine, triethanolamine, di-n-butyl amine, tri-n-butyl amine, dibenzyl amine, tetramethylene-penta-amine, the guanidines such as diphenyl guanidine and the like. Another group of catalysts that can be employed include the alkali metal sulfides, especially sodium and potassium sulfides. These latter materials are preferably employed in the presence of a small amount of an alcohol such as methanol.

The amount of catalyst employed for carrying out the present invention can vary appreciably but will generally be in the range 0.5 to 5 weight percent of the reaction mixture, preferably from about 1 to about 2 weight percent of the reaction mixture.

The process of this invention is preferably carried out in the presence of an inert diluent. Diluents suitable for use in the process are hydrocarbons which are not detrimental to the oxidation reaction. Suitable diluents include aromatics such as benzene, toluene, xylene, ethylbenzene and mixtures thereof. It is also within the scope of the invention to use straight and branched chain paraffins which contain up to and including 10 carbon atoms per molecule. Examples of paraffins which can be utilized include propane, n-butane, n-pentane, isopentane, n-hexane, isohexane, 2,2,4 - tri - methyl - pentane (isooctane), n-decane and the like. Mixtures of these paraffinic hydrocarbons can also be employed as diluents in carrying out the process of this invention. Cycloparaffins such as cyclohexane and methylcyclohexane can also be used. Also mixtures of any of the aforementioned hydrocarbons can be used as the diluent. The amount of diluent employed will vary appreciably and can range as high as 90 to 95 percent of the reaction mixture when desired.

Numerous variations in operative procedure can be employed according to the invention. Ordinarily the monomercaptan and dimercaptan are contacted with each other prior to contacting with free sulfur or a sulfur-yielding compound and a basic catalyst. However, in some instances it may be desirable to charge all of the reactants simultaneously to a reaction zone. In any event, the reaction between the dimercaptan and sulfur is carried out in the presence of a monomercaptan as described above. The reaction of the invention can be effected in a batch, intermittent or continuous manner.

The properties of the polymeric products obtained according to the invention will vary appreciably. The amount of sulfur present in the polymeric product of the invention will generally range from about 30 to about 60 weight percent. The polymers produced in accordance with this invention can be compounded by any of the known methods such as have been used in the past for compounding polysulfide polymers. Vulcanization accelerators, reinforcing agents and fillers such as have been normally employed in polysulfide rubbers can likewise be used in the compounds of this invention.

The polymers obtained by the invention have utility in applications where both natural and synthetic rubbers are used. For example, they can be used in the manufacture of automobile tires, gaskets and other rubber articles.

The polysulfide polymers of the invention can be cured by curing agents such as zinc peroxide, hydrogen peroxide, p-quinone dioxime, lead peroxide, dibutylphthalate, stearic acid, zinc chromate, lead chromate, cumene hydroperoxide, benzoyl peroxide, lauroyl peroxide, naphthenates of metals such as copper, lead, zinc, etc., and mixtures or combinations of these curing agents. By the use of the proper curing agent, the polymer can be cured either at room temperature or with mild heat.

A better understanding of our invention will be obtained upon reference to the following illustrative examples which are not intended, however, to be unduly limitative of the invention.

EXAMPLE I

A series of runs was carried out in which polysulfide polymers of 2,9-p-menthane dithiol were prepared by reacting 2,9-p-menthane dithiol with 2 moles of sulfur per mol of dithiol at a temperature of about 80° F. in the presence of diphenyl guanidine as a basic catalyst. In one run, the contacting was effected without a monomercaptan modifier and in three other runs n-butyl mercaptan and tert-dodecyl mercaptan were employed as polymerization modifier or polymer chain terminators. The contacting was effected at approximately one atmosphere pressure and in the presence of benzene as an inert diluent. In the runs employing monomercaptan modifier, the dimercaptan and monomercaptan were contacted with each other in the benzene diluent prior to contacting with sulfur and catalyst.

In these runs, benzene diluent, 2,9-p-menthane dithiol and either n-butyl mercaptan or tert-dodecyl mercaptan were charged together to a 2-liter reactor containing diphenyl guanidine catalyst. The reaction mixture thus formed was heated to a temperature of approximately 130° F. and then sulfur was added to the reaction mixture slowly over a period of about 30 minutes so as to keep the reaction mixture from boiling over due to rapid evolution of $H_2S$. After rapid evolution of $H_2S$ had stopped, the benzene solution of polymer was heated to a temperature of approximately 200° F. at about 20 mm. Hg absolute pressure to remove the last traces of benzene solvent.

The ratio of reactants employed in each run and properties of the resulting polymers are shown below in Table I.

*Table 1*

|  | Run 1 | Run 2 | Run 3 | Run 4 |
| --- | --- | --- | --- | --- |
| Modifier | None | (1) | (2) | (3) |
| Mole Ratio Dithiol/Monothiol |  | 2.5 | 5 | 2.5 |
| Mole Ratio Sulfur/Dithiol | 2 | 2 | 2 | 2 |
| Viscosity, poises at 200° F | 58 | 10 | 40 | 26 |
| Mercaptan Sulfur, wt. percent | 1.9 | 0.31 | 0.31 | 1.50 |
| Mole Weight | 1,214 | 1,052 | 1,497 | 854 |

[1] n-$C_4H_9SH$.
[2] n-$C_4H_9SH$.
[3] tert-$C_{12}H_{25}SH$.

Table I above shows the properties of sulfide polymers using mol ratios of dimercaptan to monomercaptan of 2.5 and 5 for n-butyl mercaptan and a mol ratio of dimercaptan to tert-dodecyl mercaptan of 2.5:1. It will be observed from the above table that as the amount of monomercaptan employed is increased there is a decrease in the viscosity of the resulting polymer.

EXAMPLE II

Control of the molecular weight of a polysulfide polymer according to the invention is demonstrated by the present example. The smallest repeating unit of a 2,9-p-menthane dithioltrisulfide polymer is as follows:

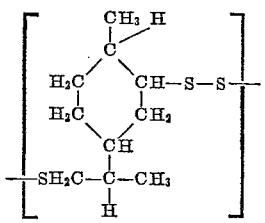

This unit has a molecular weight of 234. If it is desired to make a polymer having 10 repeating units, the following recipe is employed:

|  | Grams | Moles |
| --- | --- | --- |
| 2,9-p-menthane dithiol | 2,040 | 10 |
| n-Butyl mercaptan | 180 | 2 |
| Sulfur | 640 | 20 |

The above reactants are contacted in an inert hydrocarbon diluent at a temperature of about 80° F. with a basic catalyst (diphenyl guanidine) until the reaction is completed. The polymer is recovered from the reaction mixture and has the following structure:

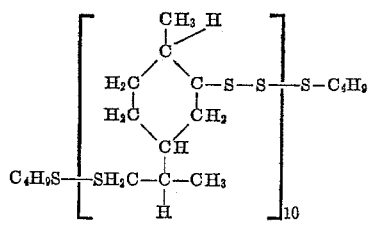

The above polysulfide polymer has a molecular weight of 2518.

If a lower molecular weight polysulfide polymer is desired, the ratio of monomercaptan to dimercaptan is increased and when higher molecular weight sulfide polymers are desired the ratio is decreased.

The polymers obtained above are clear resin-like solids at room temperature; however, they will cold flow over prolonged periods of storage. The above polymers are useful as additives for lube oil, rubber compounding, lacquers, plastics, grease additives and the like.

As will be evident to those skilled in the art many variations and modifications of this invention can be practiced in view of the foregoing disclosure. Such variations and modifications are clearly believed to come within the spirit and scope of the invention.

I claim:

1. In a process for the production of a polysulfide polymer comprising contacting under polymerization conditions in a polymerization zone an organic dimercaptan compound with sulfur in the presence of a basic catalyst, and recovering polymer so produced, the improvement which comprises carrying out said contacting in the presence of a monomercaptan compound having from 1 to 16, inclusive, carbon atoms per molecule added to said zone to provide a mole ratio of dimercaptan to a monomercaptan of at least 1:1 to control the molecular weight of said polymeric product.

2. A process according to claim 1 wherein said monomercaptan is n-butyl mercaptan.

3. A process according to claim 1 wherein said monomercaptan is tert-dodecyl mercaptan.

4. A process for the production of a polysulfide polymer comprising contacting in a polymerization zone a dimercaptan compound having the structural formula HS—R—SH, wherein R is a hydrocarbon radical having up to and including 20 carbon atoms, with a sulfur material selected from the group consisting of free sulfur and sulfur-yielding compounds in a mole ratio of said sulfur material to dimercaptan in the range of 1:1 to 5:1 in the presence of a catalytic amount of a basic catalyst at a temperature in the range 0 to 500° F., said contacting being effected in the presence of a monomercaptan having the structural formula RSH where R is a hydrocarbon radical having from 1 to 16 carbon atoms added to said zone to provide a mole ratio of dimercaptan to monomercaptan ranging from 1:1 to 50:1, and recovering polymer so produced.

5. A process according to claim 4 wherein said dimercaptan is 2,9-p-menthane dithiol, said monomercaptan is n-butyl mercaptan and said catalyst is diphenyl guanidine.

6. A process according to claim 4 wherein said dimercaptan is 2,9-p-menthane dithiol, said monomercaptan is tert-dodecyl mercaptan and said catalyst is diphenyl guanidine.

7. A process according to claim 4 wherein curing agents are incorporated into said recovered polymer and then said polymer is subjected to curing conditions.

8. The cured product of claim 7.

9. A polysulfide polymer containing from about 30 to about 60 weight percent sulfur obtained by reacting 2,9- to solid product and which is obtained by reacting an organic dimercaptan compound having up to and including 20 carbon atoms with sulfur and a monomercaptan compound having up to and including 16 carbon atoms in the presence of a basic catalyst.

10. A polysulfide polymer containing from about 30 to about 60 weight percent sulfur which consists of a viscous p-menthane dithiol with elemental sulfur and n-butyl mercaptan in the presence of diphenyl guanidine.

11. A polysulfide polymer containing from about 30 to about 60 weight percent sulfur obtained by reacting 2,9- p-menthane dithiol with elemental sulfur and tert-dodecyl mercaptan in the presence of diphenyl guanidine.

References Cited by the Examiner
UNITED STATES PATENTS

| | | | |
|---|---|---|---|
| 2,076,875 | 4/1937 | Borglin et al. | 260—609 |
| 2,329,488 | 9/1943 | Rummelsburg | 260—609 |
| 2,605,256 | 7/1952 | Conard | 260—85.5 X |
| 2,676,165 | 4/1954 | Fettes | 260—79 X |
| 3,019,267 | 1/1962 | Mahan et al. | 260—609 |
| 3,037,967 | 6/1962 | Louthan | 260—79 |

LEON J. BERCOVITZ, *Primary Examiner.*

J. R. LIBERMAN, *Examiner.*